United States Patent
Suzuki

(10) Patent No.: US 7,249,061 B1
(45) Date of Patent: Jul. 24, 2007

(54) METHOD OF ELECTRONIC COMMERCE INCLUDING RECEIVING AN ACCEPTANCE SIGNAL INDICATING A CHANGE IN A TRANSACTION AVAILABLE PERIOD BASED ON A TIME ADJUSTMENT DAY

(75) Inventor: Takao Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 665 days.

(21) Appl. No.: 10/381,430

(22) PCT Filed: Nov. 10, 2000

(86) PCT No.: PCT/JP00/07928

§ 371 (c)(1),
(2), (4) Date: Mar. 25, 2003

(87) PCT Pub. No.: WO02/27583

PCT Pub. Date: Apr. 4, 2002

(30) Foreign Application Priority Data

Sep. 27, 2000 (JP) ............................. 2000-293637

(51) Int. Cl.
*G06Q 30/00* (2006.01)

(52) U.S. Cl. .............................. 705/26; 705/1; 705/27; 705/37

(58) Field of Classification Search .................. 705/26, 705/27, 37, 1
See application file for complete search history.

(56) References Cited

U.S. PATENT DOCUMENTS

| | | | | |
|---|---|---|---|---|
| 6,141,666 | A * | 10/2000 | Tobin ......................... | 715/513 |
| 6,208,996 | B1 * | 3/2001 | Ben-Shachar et al. ... | 707/104.1 |
| 6,415,269 | B1 * | 7/2002 | Dinwoodie ............... | 705/36 R |
| 6,427,132 | B1 * | 7/2002 | Bowman-Amuah ......... | 703/22 |
| 2002/0165817 | A1 * | 11/2002 | Rackson et al. ............. | 705/37 |
| 2004/0059646 | A1 * | 3/2004 | Harrington et al. ........... | 705/27 |
| 2004/0215517 | A1 * | 10/2004 | Chen et al. .................... | 705/14 |
| 2005/0027613 | A1 * | 2/2005 | Takekuma et al. ............ | 705/26 |

FOREIGN PATENT DOCUMENTS

| | | |
|---|---|---|
| EP | 0 640 897 A1 | 3/1995 |
| EP | 0 641 129 A1 * | 3/1995 |
| EP | 0 652 497 A2 | 5/1995 |
| JP | 10-320494 | 12/1998 |
| WO | 97/37315 | 10/1997 |

OTHER PUBLICATIONS

"Sales, Shows, and Events;" Helen Holzer and Sabine Morrow, The Atlanta Journal Constitution, May 13, 1999, p. BE. 8. Retrieved via ProQuest on Apr. 6, 2007.*
Yoshihira Suzuki (ed.) et al., "NOTESDATETIME," Lotus Notes Encyclopedia, vol. 3, Application Kaihatsu (ed.), 1st printing, Kabushiki Kaisha Ascii, (Jul. 31, 1997), pp. 551-556.

* cited by examiner

*Primary Examiner*—Jeffrey A. Smith
*Assistant Examiner*—Michael A. Misiaszek
(74) *Attorney, Agent, or Firm*—Finnegan, Henderson, Farabow, Garrett & Dunner, L.L.P.

(57) ABSTRACT

An electronic commerce server (10) including a time adjustment information memory unit (10b), an irregular day information comparison circuit (43), and an irregular day notification circuit (44). The time adjustment information memory unit (10b) records information on time adjustment. The irregular day information comparison circuit (43) compares the transaction available period and the time adjustment information. The irregular day notification circuit (44) notifies the occurrence of a day on which time adjustment is performed. The electronic commerce server (10) checks whether there is a region where time adjustment is performed during the transaction available period. If a start-date or end data of Daylight Saving Time occurs, that day is checked by the irregular day information comparison circuit (43). The irregular day notification circuit (44) transmits the occurrence of a time adjustment day to the computer (1a) for the seller. The seller changes that transaction available period, and the buyer learns the fact that an irregular day, that is the start-date or end-date, occurs during the transaction available period and how much the transaction available period will differ from the current clock time.

13 Claims, 10 Drawing Sheets

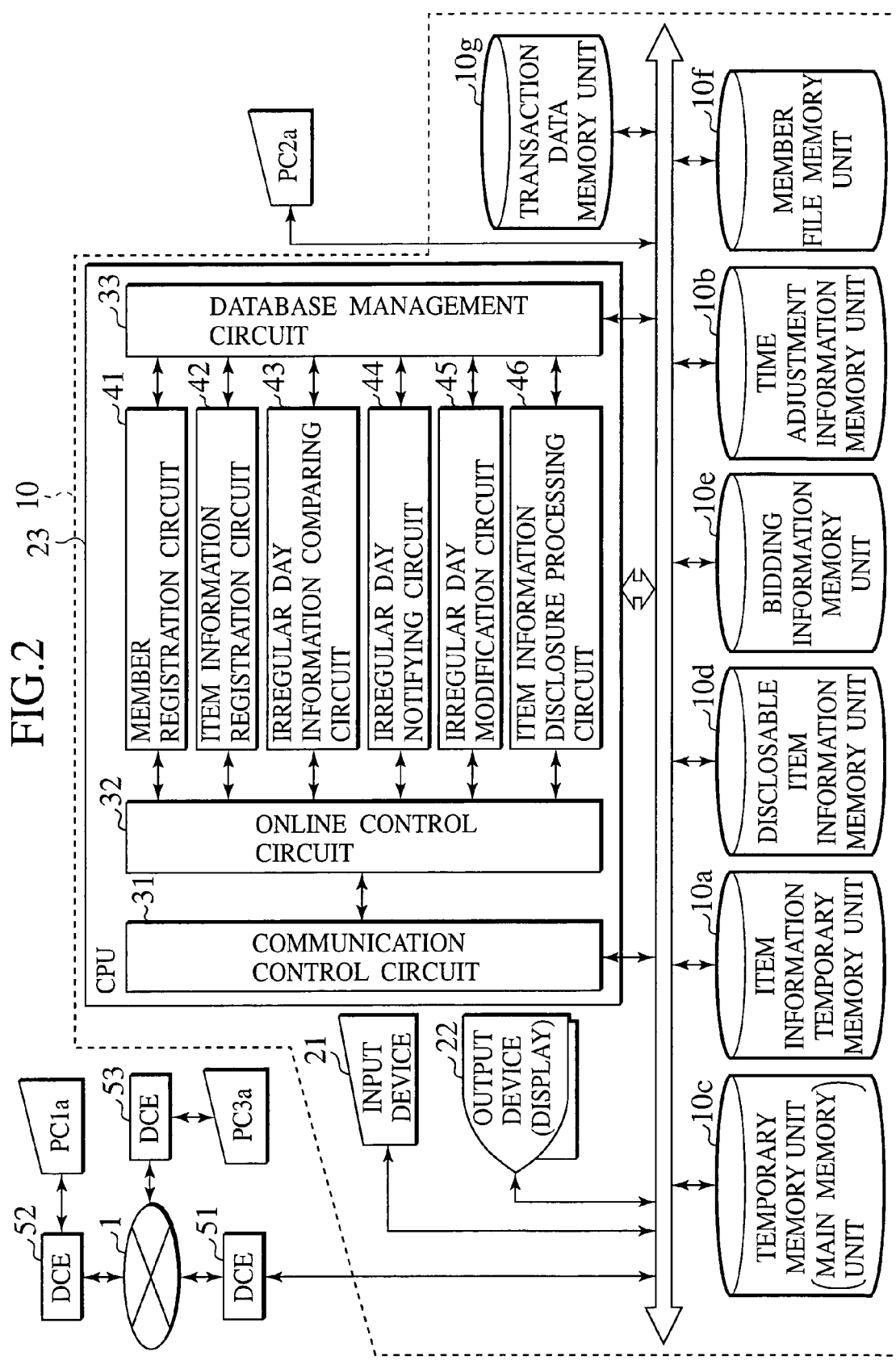

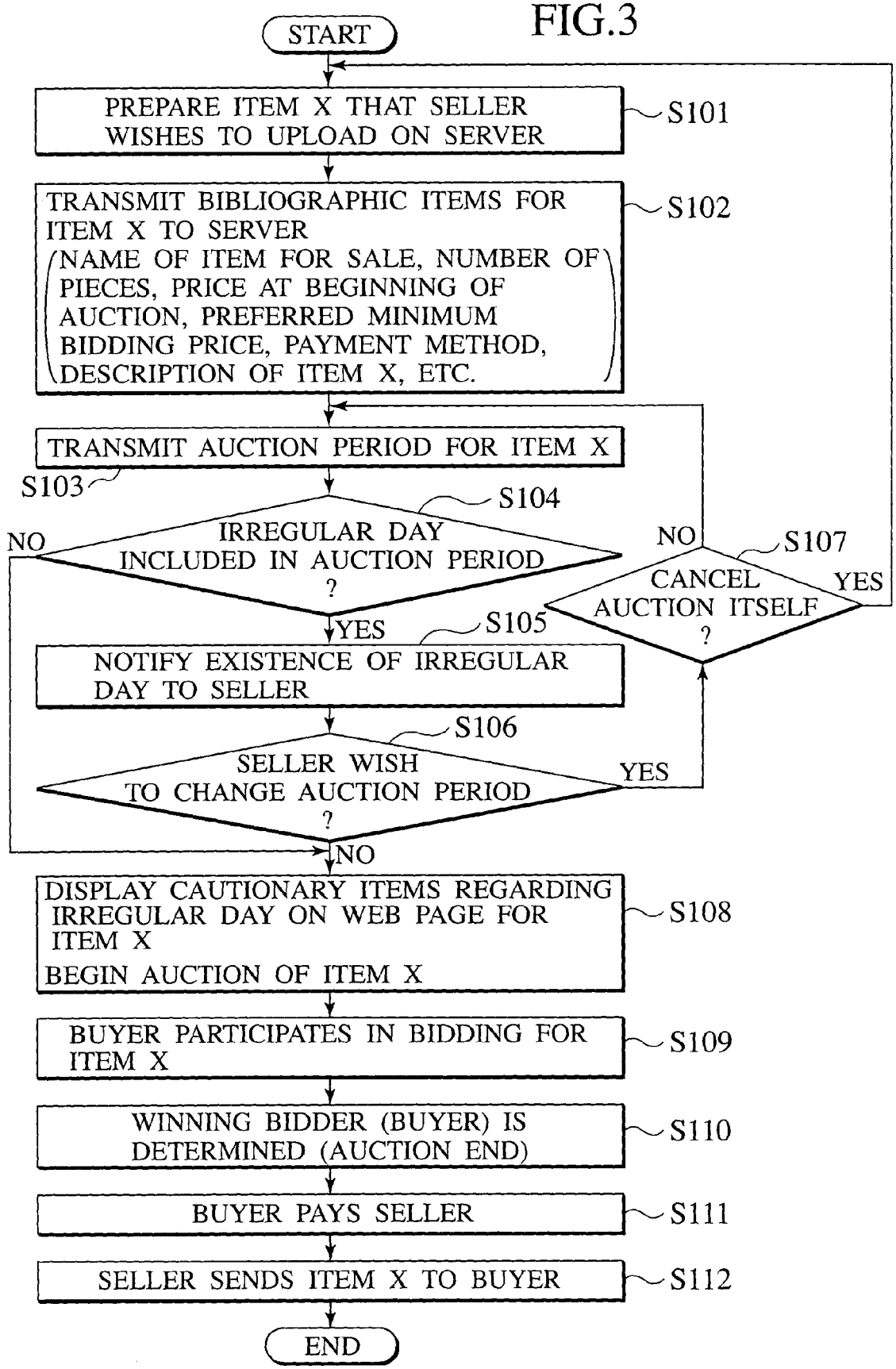

FIG.4

REGISTRATION

★★ REGISTER YOUR ITEM FOR SALE IN THE AUCTION ★★
(FILL IN THE ITEMS GIVEN BELOW)

○ ENTER THE NAME OF ITEM X YOU WISH TO PROVIDE
(E.G. VALUABLE GRANDFATHER CLOCK MADE IN THE 1920S)

○ SELECT ONE CATEGORY TO WHICH ITEM X BELONGS FROM THE MENU
(FOR EXAMPLE; CLOCK)

[SELECT ▽]

○ ENTER A DETAILED EXPLANATION ON ITEM X

○ ATTACH ELECTRONIC IMAGE(S) OF ITEM X IF AVAILABLE (OPTIONAL)

※ IF THE ELECTRONIC IMAGE IS ON A WEB PAGE,
ENTER THE ADDRESS IT IS LINKED TO BELOW http://www.

○ ENTER THE COUNTRY AND STATE/PROVINCE WHERE YOU LIVE
(FOR EXAMPLE, UNITED STATES NEW YORK)

COUNTRY [SELECT ▽] STATE [        ]

○ SELECT THE FORM OF PAYMENT YOU WISH
(MORE THAN ONE CAN BE SELECTED)
- ☐ CREDIT CARD                           ☐ PERSONAL CHECK
  - ☐ CARD OF COMPANY A    ☐ CARD OF COMPANY D
  - ☐ CARD OF COMPANY B    ☐ CARD OF COMPANY E    ☐ MONEY ORDER
  - ☐ CARD OF COMPANY C

○ ENTER THE NUMBER OF UNITS OF ITEM X (FOR EXAMPLE, ONE UNIT)

[    ] UNIT(S)

○ ENTER THE PREFERRED MINIMUM BIDDING PRICE (FOR EXAMPLE, US $10000.00)

CURRENCY [SELECT ▽] AMOUNT [        ]

○ SELECT THE AUCTION PERIOD (FOR EXAMPLE, 7 DAYS)

[SELECT ▽]

○ ENTER YOUR NAME, RESIDENCE, AND E-MAIL ADDRESS

NAME   First Name [        ]   Last Name [        ]
       Middle Name (OPTIONAL) [        ]

RESIDENCE [        ]

E-MAIL ADDRESS [        ]

※ AFTER CONFIRMING ALL ITEMS ARE ENTERED,
CLICK THE "REGISTER" BUTTON

[ REGISTER ]

FIG.9

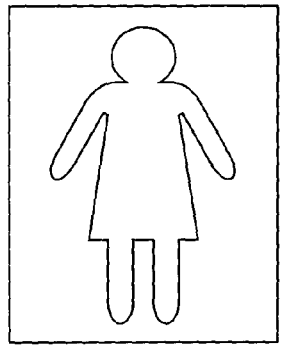

NAME OF ITEM : BISQUE DOLL FROM
FOR SALE         19TH-CENTURY FRANCE(RARE ITEM!)
NUMBER OF ITEM FOR SALE : 13572468
SELLER     : ELLEN
RESIDENCE : ARLINGTON, VIRGINIA, U.S.A.
CATEGORY : DOLL
QUANTITY : 1
FORM OF PAYMENT : VISA, MASTERCARD,
                  OR PERSONAL CHECK
END DATE OF AUCTION    :
(U.S. EASTERN TIME ZONE)
       APRIL 5, 2000, 9:10:00 PM
TIME LEFT UNTIL AUCTION ENDS  :
           13 HOURS, 45 MINUTES, 27 SECONDS
CURRENT HIGHEST BIDDING PRICE : US $1530.00
CURRENT HIGHEST BIDDER         : TAKAO (DESCRIPTION) THIS BISQUE DOLL HAS BEEN IN MY FAMILY FOR A
    LONG TIME. I WISH FOR SOMEONE WHO WOULD TAKE GOOD
    CARE OF IT TO HAVE IT. THE DOLL IS MADE OF LEATHER
    AND ELABORATELY SEWN DOWN TO DETAILS. IT HARDLY
    HAS FEW STAINS OR SCARS. A 19TH CENTURY PIECE IS VERY
    RARE SO DON'T MISS THIS CHANCE.

★ MESSAGE FROM AUCTION ADMINISTRATOR ★
THE AUCTION PERIOD OF THIS ITEM FOR SALE INCLUDES THE
START DATE OF DAYLIGHT SAVING TIME IN EUROPE AND THE
START DATE OF DAYLIGHT SAVING TIME IN NORTH AMERICA.
THE CHANGE IN TIME DIFFERENCE MUST BE GIVEN ATTENTION
TO WHEN BIDDING FROM THESE REGIONS. ON THE START DATE
OF DAYLIGHT SAVING TIME, 2:00 AM IS CHANGED TO 3:00 AM.
CHECK "TIME LEFT UNTIL AUCTION ENDS" DISPLAYED ABOVE.
NOTE : ANY PROBLEMS BETWEEN THE SELLER AND BUYER CAUSED
    BY THE ABOVE PHENOMENON WILL NOT BE THE
    RESPONSIBILITY OF THE ADMINISTRATOR OF
    THIS AUCTION

IF YOU WISH TO MAKE A BID, PROCEED TO THE BIDDING SCREEN
AFTER THOROUGHLY READING THE REGULATIONS REGARDING
THIS AUCTION

GO TO BIDDING SCREEN

METHOD OF ELECTRONIC COMMERCE INCLUDING RECEIVING AN ACCEPTANCE SIGNAL INDICATING A CHANGE IN A TRANSACTION AVAILABLE PERIOD BASED ON A TIME ADJUSTMENT DAY

FIELD OF THE INVENTION

The present invention relates to electronic commerce (electric commerce). In particular, it is related to an electronic commerce method for efficient and smooth electronic transactions between different countries (such as Japan and the United States), and an electronic commerce server used by an electronic commerce system for implementing this method, and furthermore a recording medium where a computer-readable program configured to control this electronic commerce server is recorded.

BACKGROUND OF THE INVENTION

In recent years, cross-border electronic commerce has become easier through utilization of the Internet. "Online auction" is an example of electronic commerce utilizing the Internet. This is a system where a seller that has an item for sale uploads information on that item for sale onto an auction site on the Internet, and the buying price is determined through bidding by a plurality of buyers wishing to buy that item for sale.

Many electronic commerce transactions take a form of business-to-business (BtoB) or business-to-consumer (BtoC), however, in the case of online auctions, transactions are mainly in the form of consumer-to-consumer (CtoC). Accordingly, online auctions can contribute at large to the popularization of electronic commerce.

However, the Internet is widely used throughout the entire world, and addresses of the people participating in online auctions are also wide-ranging. Accordingly, there are many cases where a seller lives in the United States, whereas a buyer lives in Japan, for example. In the case where such international electronic commerce is conducted, the following points must be taken into consideration.

In many major industrialized countries in the world, including the United States, "Daylight Saving Time" (or "Summer Time in the United Kingdom") is introduced every year. With this system, the clock is shifted forward one hour on a certain day for approximately half a year spanning the summer when daylight is relatively long, and in turn shifted back on a certain day for approximately half a year spanning the winter when daylight is relatively short. There are several reasons for introducing Daylight Saving Time; to economize energy or fossil fuels, be in line with neighbor countries, economic policy, and effectively utilize the daytime hours. Daylight Saving Time has been introduced in at least 70 countries in the world at the present. Particularly, among the 29 countries that have joined the Organization for Economic Co-operation and Development (ODEC). It is implemented in all ODEC countries except for Japan, South Korea, and Iceland where introduction of Daylight Saving Time is not needed because of the midnight sun.

More specifically, in the case of the United States, clocks are advanced one hour on the start-date of Daylight Saving Time by re-setting the clock so that one minute after 1:59 A.M. becomes 3:00 A.M. Then on the end-date of Daylight savings, clocks are turned back one hour by re-setting the clock so that one minute after 1:59 A.M. becomes 1:00 A.M. In North America, i.e. the United States and Canada, the start-date of Daylight Saving Time is set to the first Sunday in April and the end-date to the last Sunday in October. In addition, in Europe, i.e. the United Kingdom and EU affiliated countries, the start-date of Daylight Saving Time is set to the last Sunday in March and the end-date to the last Sunday in October. In the year 2000, the start-date of Daylight Saving Time is April 2nd and the end-date of Daylight Saving Time is October 29th in North America, whereas the start-date of Daylight Saving Time is March 26th and the end-date of Daylight Saving Time is October 29th in Europe.

In turn, for countries where Daylight Saving Time has not been introduced such as Japan, there is limited understanding of this system, and there is a possibility that confusion may occur due to time adjustment on the start-date and end-date of this system. Namely, due to the start-date consisting of 23 hours and the end-date consisting of 25 hours in this system, there is a one-hour time difference in the finish time of online auction accompanying this. Accordingly, an online auction valid for three days is normally conducted for a period of 24 hours×3=72 hours, however, in the case where the start-date of Daylight Saving Time is included in that period, the clock time at the end is one hour shorter than the clock time at the beginning. Similarly, in the case where the end-date of Daylight Saving Time is included in that period, the clock time at the end is one hour longer than the clock time at the beginning. Thus, if for instance, a Japanese person is to participate in this online auction, that finish time is difficult to ascertain easily, and there may be a possibility of losing the opportunity to participate in the last-minute bidding, which is the most important action in online auctions.

Furthermore, such a problem is not just a problem for those whose country does not adopt Daylight Saving Time system such as Japanese. Even in the case where both the seller and buyer live in the United States, a problem similar to the one above happens unless accustomed to the time adjustment on the start-date and end-date of Daylight Saving Time, which occurs only twice a year.

Particularly, the one-hour from 1:00 A.M. to 2:00 A.M. occurs twice on the end-date of Daylight Saving Time. Accordingly, in the case where the finish time of an online auction is at 1:00 A.M. on that end-date, ascertaining which 1:00 A.M. is the original finish time of the online auction is extremely difficult for even someone who lives in a country that adopts Daylight Saving Time.

Furthermore, the time for Daylight Saving Time adjustment, that is 1:00 A.M. or 2:00 A.M. in the middle of the night (around noon in Japan time), is a period of time when comparatively many people connect to the Internet. Therefore, time adjustment at this period of time increases the number of cases where hereafter caution is required in not only online auction but other electronic commerce transactions as well.

SUMMARY OF THE INVENTION

An object of the present invention is therefore to solve the above problems, and even in the case where an irregular day is included in the period for conducting electronic commerce, provide an electronic commerce server that can be used in an electronic commerce system that notifies this irregular day to the input terminals owned by the sellers and buyers for realizing smooth and fair transactions. However, an "irregular day" in the present invention refers to a day that requires time adjustment with respect to the clock time. To be more precise, the start-date or end-date of Daylight Saving Time is such kind of a day.

Another object of the present invention is to provide an electronic commerce method that realizes smooth and fair transactions worldwide even in the case where an irregular day is included in the period for conducting electronic commerce by absolutely ascertaining the existence, details, significance, and the like of this irregular day. In other words, by ascertaining the existence of an irregular day without fail, particularly in the case of online auctions or the like, the present invention aims to provide an electronic commerce method that prevents confusion or drawbacks from occurring during the "processing just before the transaction period ends", which has one of the most important meaning in such electronic commerce transaction.

Yet another object of the present invention is to provide an electronic commerce method in which, in the case where an irregular day is included in the period for conducting electronic commerce, the existence of this irregular day is notified to the input terminals owned by the sellers and buyers, and a seller can re-set the transaction period as required.

Yet another object of the present invention is to provide a recording medium storing a program, configured to control of the electronic commerce server, adapted for installing in the electronic commerce server, in the case where an irregular day is included in the period for conducting electronic commerce, the electronic commerce server detects this and notifies that result to the input terminals owned by the sellers and buyers.

In order to achieve the above objects, a first aspect of the present invention inheres in an electronic commerce server that includes a time adjustment information memory unit, an irregular day information comparison circuit, and an irregular day notification circuit. As used hereinafter, the "time adjustment information memory unit" shall mean a memory unit for recording countries or global regions where time adjustment is performed with respect to the clock time, and the time adjustment information with respect to the details of this time adjustment. The "irregular day information comparison circuit" shall mean a calculation circuit installed in a CPU or the CPU itself, which executes processing for comparing (data matching) the period available for transaction for electronic commerce that is input to the electronic commerce server via the input terminal connected to an information network, with the time adjustment information recorded in the time adjustment information memory unit in the electronic commerce server. The "irregular day notification circuit" shall mean a calculation circuit installed in the CPU (or the CPU itself), which executes processing to electronically display the occurrence of a day on which time adjustment is performed on a display unit (screen) or the like in the corresponding input terminal via the information network in the case where existence of an applicable time adjustment day in the transaction available period is determined as a result of comparison by the irregular day information comparison circuit. As used hereinafter, the "transaction available period" stands for in the case, such as online auction where the bidding deadline is set, the period from the start of the transaction to the bidding deadline.

If the start-date or end-date of Daylight Saving Time, or the like is included in the transaction available period, since this electronic commerce cannot be judged correctly from the current clock time itself, it may finish one hour early or one hour late; which may complicate the electronic commerce and inflict a loss on some buyers or the like. Particularly, though the bidding at the last minute is most important in online auction, if the current clock time cannot be determined correctly, one may fail to participate in online auction and suffer a loss. The electronic commerce server according to the first aspect of the present invention can check, in an electronic commerce transaction where the transaction available period is limited, whether there is any region that performs time adjustment with respect to the clock time during that transaction available period. For example, if the start-date or end-date of Daylight Saving Time in the United States, Canada, or the United Kingdom exists, the irregular day information comparison circuit checks those start-dates and end-dates. The irregular day notification circuit can then transmit the existence of the time adjustment day confirmed by the irregular day information comparison circuit to the input terminal of a computer, portable information terminal, or the like owned by the seller via an information network. Accordingly, if the fact that the start-date or end-date of Daylight Saving Time falls in this transaction available period, or information such as how much the transaction available period will differ from the current clock time is electronically displayed, then the seller can change that transaction available period to a less confusing period. Furthermore, the irregular day notification circuit can also transmit the existence of the time adjustment day (irregular day) to an input terminal of a computer, portable information terminal, or the like owned by the buyers via an information network. A buyer is informed of the fact that the start-date or end-date of Daylight Saving Time, that is an irregular day, falls in the transaction available period, or about information such as how much the transaction available period will differ from the current clock time, and thus able avoid the danger of suffering a loss by conducting electronic commerce with caution. Therefore, confusion in electronic commerce caused by the occurrence of an irregular day can be kept to a minimum allowing constantly stable electronic commerce to be expected.

A second aspect of the present invention inheres in an electronic commerce method that includes (a) a step of recording regions where time is adjusted with respect to the clock time around the world, and time adjustment information with respect to the details of this time adjustment; (b) a step of comparing a transaction available period for electronic commerce fed through an information network, with the time adjustment information recorded in the time adjustment information memory unit; and (c) a step of electronically displaying the existence of a time adjustment day via the information network in the case where the existence of an applicable time adjustment day in the transaction available period is determined as this comparison result.

In other words, according to the electronic commerce method according to the second aspect of the present invention, in the case where the electronic commerce has a transaction available period, whether there is any region that performs time adjustment with respect to the clock time during that transaction available period can be checked. Electronic display of the fact that the start-date or end-date of Daylight Saving Time occurs in this transaction available period, or time adjustment information such as how much the transaction available period will differ from the current clock time, onto the display unit of the input terminals owned by the seller and buyers minimizes confusion that may occur in the electronic commerce and constantly stable electronic commerce can be expected.

The third aspect of the present invention inheres in an electronic commerce method that includes (a) a step of transmitting information with respect to an item for sale from an input terminal of a computer, portable information terminal, or the like for the seller to a electronic commerce server via an information network to electronically disclose an item for sale; (b) a step of transmitting a transaction available period for electronic commerce of the item for sale from the input terminal of the seller to the electronic commerce server via the information network; and (c) a step of having the input terminal of the seller notified by the electronic commerce server via the information network of the existence of a time adjustment day in the case where the transaction available period includes a day on which time adjustment with respect to the clock time is performed in any region.

According to the electronic commerce method according to the third aspect of the present invention, if the transaction available period includes a day on which time adjustment with respect to the clock time is performed in any region in the case where the electronic commerce has a transaction available period, the input terminal of a computer, portable information terminal, or the like for the seller is notified by the electronic commerce server via the information network about the existence of this time adjustment day. Accordingly, the seller of the item for sale can confirm the existence of the time adjustment day through the screen of a computer, portable information terminal, or the like, which is connected to the information network. If the occurrence of the time adjustment day appears to cause confusion or drawbacks in the electronic commerce of the currently intended item for sale, the seller can change the transaction available period to another one that is not affected by the time adjustment day or cancel the electronic commerce. Therefore, it is possible for the seller to make a setting to minimize confusion in electronic commerce conducted on a worldwide network that includes regions where time adjustment with respect to the clock time is performed, such as the start-date or end-date of Daylight Saving Time, and constantly stable electronic commerce can thus be expected.

The electronic commerce of the present invention can be executed by saving a program for putting into practice the electronic commerce method described in the second aspect of the present invention into a machine-readable recording medium, and then reading this recording medium into a computer system. In other words, a fourth aspect of the present invention pertains to a recording medium storing an electronic commerce program. The recording medium is adapted for installing a computer-readable program so as to control an electronic commerce server, electronically configured to disclose an item for sale on the seller's side. More specifically, the program recorded in the recording medium according to the fourth aspect of the present invention includes (a) a step of recording regions where the time is adjusted with respect to the clock time around the world, and the time adjustment information related to the details of this time adjustment in the time adjustment information memory unit in the electronic commerce server; (b) a step of using the irregular day information comparison circuit in the electronic commerce server to compare the transaction available period for electronic commerce input in the electronic commerce server via the information network, with the time adjustment information recorded in the time adjustment information memory unit; and (c) a step of making the irregular day notification circuit in the electronic commerce server transmit the occurrence of this time adjustment day to each corresponding input terminal via the information network for electronic display in the case where an applicable time adjustment day occurs in the transaction available period as this comparison result. As used hereinafter a "recording medium" shall mean a medium on which a program can be recorded, such as an external memory device of a computer, semiconductor memory, magnetic disk, optical disk, magnetic optical disk, magnetic tape, etc.

That is, a "recording medium" may include a floppy disk, CD-ROM, MO, DVD-ROM, DVD-RAM, cassette tape, open-reel tape, or the like.

With the recording medium storing an electronic commerce program according to the fourth aspect of the present invention, in the case where the electronic commerce has a transaction available period, whether there is any region that performs time adjustment during that transaction available period can be checked through data matching by the irregular day information comparison circuit embedded in the CPU of the electronic commerce server. The fact that a start-date or end-date of Daylight Saving Time occurs in the transaction available period or information such as how much the transaction available period will differ from the current clock time can be electronically displayed on the display unit or the like of the corresponding input terminal through drive and control of the irregular day notification circuit, online control circuit, communication control circuit, and the like embedded in the CPU. As described above, since a computer (electronic commerce server) connected to an information network can be effectively controlled to provide stable electronic commerce, confusion that may be caused in electronic commerce where the transaction available period, in particular the time of the transaction end has important meaning can be minimized and constantly stable electronic commerce can be expected.

BRIEF DESCRIPTION OF THE DRAWINGS

FIG. 2 is a block diagram showing the configuration of an electronic commerce server according to an embodiment of the present invention.

FIG. 3 is a flowchart showing the procedure flow in an electronic commerce method according to an embodiment of the present invention.

FIG. 4 is a diagram illustrating an example of the input screen that is used for uploading information with respect to an item X, and is provided from an electronic commerce server according to an embodiment of the present invention.

FIG. 9 is a diagram illustrating an example of an online auction screen with respect to the item X and a method for displaying the description of an irregular day, which are created in the electronic commerce server.

DETAILED DESCRIPTION OF THE INVENTION

Figure 1:
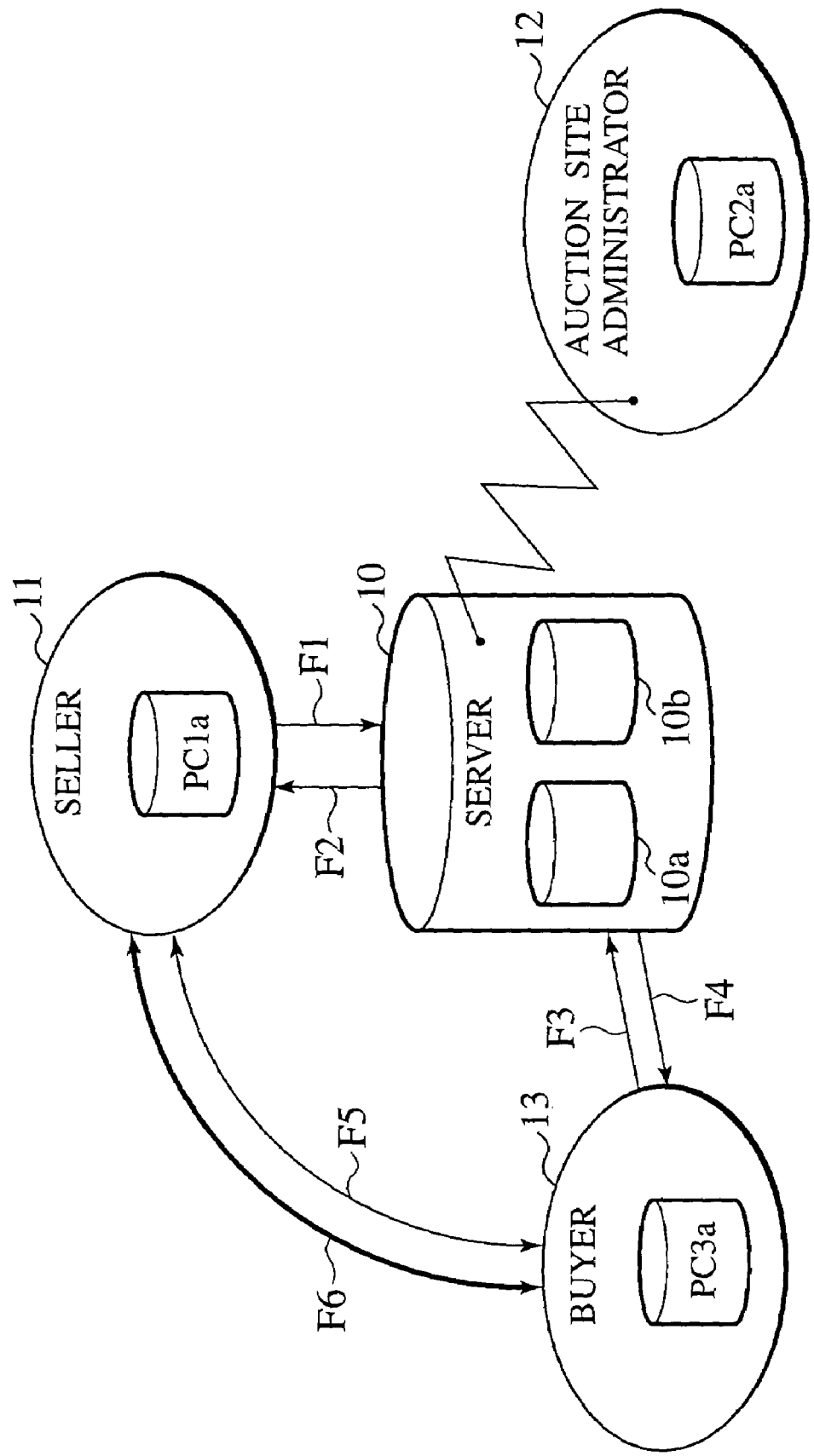
FIG. 1 is a schematic diagram illustrating the flow of information and goods in an electronic commerce method according to an embodiment of the present invention.

Hereinafter, an exemplary online auction is used to describe the best mode for carrying out the present invention with reference to the accompanying drawings. It is to be noted that the same reference numerals are applied to the same parts and redundant description of the same parts will be omitted in the description of the embodiments given below.

(Configuration of Electronic Commerce System)

FIG. 1 is a schematic diagram illustrating the flow of information and goods in an electronic commerce system according to an embodiment of the present invention. In FIG. 1, thin arrows F1 to F5 indicate the "flow of information" and a bold arrow F6 indicates the "flow of goods". Furthermore, FIG. 1 shows the relationships between a seller 11, a buyer 13, and an auction site administrator 12 in an online auction. The following description is made on the assumption that the seller 11, buyer 13, and auction site administrator 12 have computers (PCs) 1a, 2a, and 3a, respectively, which are used as input terminals. Although not shown in the drawing, each of these computers 1a, 2a, and 3a is equipped with a central processing unit (CPU), input device, output device, temporary memory unit (main memory unit), etc.

In addition, the auction site administrator 12 has an electronic commerce server 10, which is connected to the computer 3a. As shown in FIG. 2, the electronic commerce server 10 is equipped with a CPU 23, an input device 21, an output device 22, a temporary memory unit (main memory unit) 10c, etc. The electronic commerce server 10 is connected to an information network (the Internet) 1 via data circuit terminating equipment (DCE) 51. The computers 1a and 3a are similarly connected to the information network 1 via DCE 52 and DCE 53, respectively. A modem, a digital signal unit (DSU), a network control unit (NCU), a communication control unit (CCU), communication control processor (CCP), or the like can be used for the DCE 51, 52, and 53. Furthermore, because a portable information terminal can also serve as the computer (PC) 1a or 3a, a communication network connection device which uses electro-magnetic waves such as microwaves or millimeter waves, infrared rays, ultrasound, or the like can be used instead of DCE. For example, a cell phone, a PHS, a PDA, a notebook computer, an electronic organizer, or the like may correspond to a "portable information terminal". With this cell phone or the like, a wireless communication equipment (wireless circuit), transmission antenna, reception antenna, or the like corresponds to the communication network connection device. "Wireless communication equipment" may be implemented, for example, by a low noise amplifier, a mixer, an intermediate frequency (IF) amplifier, a demodulator, filter, an A/D converter, a processor, a modulator, a modulator, a driver amplifier, a phase device, a transmit amplifier, and the like.

In addition, the electronic commerce server 10 is equipped with an item information temporary memory unit 10a, a disclosable item information memory unit 10d, a bidding information memory unit 10e, and a time adjustment information memory unit 10b. The item information temporary memory unit 10a, disclosable item information memory unit 10d, bidding information memory unit 10e, and time adjustment information memory unit 10b can be either provided internal to the electronic commerce server 10 or connected to the electronic commerce server 10 as an external memory unit. For example, a database server may be set up, and then the item information temporary memory unit 10a, disclosable item information memory unit 10d, bidding information memory unit 10e, and time adjustment information memory unit 10b provided in this database server. In addition, it is possible for a member file memory unit 10f, a transaction data file memory unit 10g, or the like to be included in the database server. The bibliographic data (item information) for each item for sale is recorded in the item information temporary memory unit 10a. For example, "personal information on the seller (name, residence address, E-mail address, etc.)", "name of item for sale", "numerical quantity (number of pieces)", "price at beginning of auction", "preferred minimum bidding price (reserve)", "payment method (form of payment)", "description of item for sale", and the like are recorded as bibliographic data (item information) with respect to each item for sale. Image data or the like of that item for sale may be included in the "description of item for sale". The item information recorded in the item information temporary memory unit 10a is transferred to the disclosable item information memory unit 10d under specific conditions and at specific times. The item information recorded in the disclosable item information memory unit 10d is commonly provided to the auction site on the information network in response to access from the buyer 13 side. However, information that should be disclosed only to the auction site administrator 12 (e.g. name, residence address, or the like of the seller 11) is transferred to the member file memory unit 10f and sufficient security measures are taken so that it remains undisclosed. In other words, constant filtering processing is performed when transferring information recorded in the item information temporary memory unit 10a to the disclosable item information memory unit 10d. Information on irregular days throughout the world is recorded as a database in the time adjustment information memory unit 10b. Alternatively, days that require time adjustment with respect to the clock time, or information on regions that require time adjustment may be recorded as a database. More specifically, information with respect to days where there is a one-hour change in the clock time, such as with Daylight Saving Time (Summer Time), is recorded in the time adjustment information memory unit 10b as a database where a code for distinguishing specific regions or countries is used as the master key. There are various types of auctions conducted on the information network 1, such as an auction conducted on a worldwide scale or an auction conducted only in a specific region. For a worldwide auction, it is important to store in the time adjustment information memory unit 10b data on irregular days for as many regions or countries as possible. On the other hand, in the case where the auction is limited to a specific region, country, or the like, only data on that specific region, country, or the like needs to be stored in the time adjustment information memory unit 10b. In addition to that, a method of successively updating the data in the time adjustment information memory unit 10b based on information on the places where the registered users live is also available. Recorded in the bidding information memory unit 10e is information transmitted from the computer 3a for the buyer 13, such as "personal information on the seller (name, residence address, E-mail address, etc.)", "maximum bidding price", or the like. In the member file memory unit 10f, a record comprising the representative name, residence address, phone number, FAX number, E-mail address, capital, type of business, number of employees, bank name, and the like is recorded with the registration number (ID number) of the seller 11, which is used as the master key. A member file including personal information on the buyer 13 may be further stored together with the ID number (identification code) or the like in this member file memory unit 10f. In the transaction data file memory unit 10g, the name of the item for sale, registration number (ID number) of the seller 11, name (or registration number or the like) of the buyer 13, contract bidding price, auction period, auction end date, etc. are recorded as the results of the electronic commerce transaction.

The CPU 23 of the electronic commerce server 10 includes a communication control circuit 31, an online control circuit 32, a database management circuit 33, a member registration circuit 41, an item information registration circuit 42, an irregular day information comparison circuit 43, an irregular day notification circuit 44, an irregular day modification circuit 45, an item information disclosure processing circuit 46, and the like. The CPU 23 of the electronic commerce server 10 naturally also has circuitry that forms the center segment of a computer system that configures the electronic commerce server 10 and is used for receiving data and outputting a result after calculation, through control of the input and output devices 21 and 22. The online control circuit 32 analyzes information (messages) received from the information network 11, and performs processing to have the required processing executed by the member registration circuit 41, item information registration circuit 42, irregular day information comparison circuit 43, irregular day notification circuit 44, irregular day modification circuit 45, item information disclosure processing circuit 46, and the like. The communication control circuit 31 performs processing to transfer information (messages) received from the information network 1 to this online control circuit 32. In the case where the member registration circuit 41, item information registration circuit 42, irregular day information comparison circuit 43, irregular day notification circuit 44, irregular day modification circuit 45, item information disclosure processing circuit 46, and the like requires input and output between the item information temporary memory unit 10a, disclosable item information memory unit 10d, bidding information memory unit 10e, time adjustment information memory unit 10b, member file memory unit 10f, transaction data file memory unit 10g, and the like, the database management circuit 33 searches where the necessary files are stored within each of the relevant memory units, and performs processing for reading and writing the files. The item information registration circuit 42 performs processing required to register the item information with respect to a specific item for sale, which is fed through the information network 1. For example, item information with respect to a specific item for sale, which is transmitted from the computer 1a for the seller 11, or additional or amendment information on this item information is transferred to the communication control circuit 31 and online control circuit 32. Item information is then transferred from the online control circuit 32 to the database management circuit 33 via the item information registration circuit 42. The database management circuit 33 then writes that item information in the file for the applicable item for sale in the item information temporary memory unit 10a using the identification code of that item for sale as the master key. The irregular day information comparison circuit 43 performs processing for comparing (data matching) the transaction period available for electronic commerce input via the information network 1, with the time adjustment information recorded in the time adjustment information memory unit 10b. In the case where an "applicable time adjustment day" occurs in the corresponding transaction available period as the comparison result of the irregular day information comparison circuit 43, the irregular day notification circuit 44 performs the processing required to electronically display on the displays of the corresponding input terminals 1a and 3a of the seller and buyer, this "occurrence of a time adjustment day" via the information network 1. The irregular day modification circuit 45 performs various types of processing required to change the transaction available period corresponding to the electronic commerce with respect to the specific item for sale by making use of information input to the electronic commerce server 10 via the information network 1. The item information disclosure processing circuit 46 performs processing required to electronically disclose over the information network 1, the disclosable item information recorded in the disclosable item information memory unit 10d. For example, if a specific piece of item information is selected from among the pieces of item information written in the disclosable item information memory unit 10d, this specific piece of item information is read out by the database management circuit 33 and transmitted to the computer 3a for the buyer 13 via the online control circuit 32 and communication control circuit 31. The member registration circuit 41 performs processing required to record the representative name, residence address, phone number, FAX number, E-mail address, capital, type of business, number of employees, bank name, and the like with respect to the seller 11 in the member file memory unit 10f. At this time, processing for assigning a password and ID number for a member and sending notification to the computer 1a of the corresponding seller 11 is also performed. Member registration can be executed on the screen of the auction site (or a general transaction site that can access the electronic commerce method according to an embodiment of the present invention) provided by the electronic commerce server 10, and accordingly the member registration circuit 41 also performs processing to provide the screen necessary for such member registrations. While viewing the display screen of the computer 1a, the seller 11 can input the representative name, residence address, phone number, FAX number, E-mail address, capital, type of business, number of employees, name of bank with account, and the like, which are required for member registration, using an input form comprising text boxes and drop-down lists. After the password and ID number of the member are assigned, the member registration circuit 41 notifies it to the corresponding computer 1a.

The above-mentioned communication control circuit 31, online control circuit 32, database management circuit 33, member registration circuit 41, item information registration circuit 42, irregular day information comparison circuit 43, irregular day notification circuit 44, irregular day modification circuit 45, item information disclosure processing circuit 46, etc., may be implemented by hardware by preparing a dedicated IC chip (or a part of an LSI chip to be used) for each, or each may be put into practice with an equivalent function within a CPU of a general-purpose computer and controlled by the corresponding software program.

The input devices 21 of the electronic commerce server 10 may be implemented by, for example, a respective keyboard, mouse, and the like, whereas the output devices 22 may be implemented by, for example, a display, such as a liquid crystal display (LCD) or CRT display, a printer. The computer 2a owned by the auction site administrator 12 functions as an input device for the electronic commerce server 10. For example, the computer 2a may be connected to the electronic commerce server 10 via a LAN. Alternatively, the computer 2a may also be directly connected to the electronic commerce server 10 using for example an RS-232C, SCSI, or USB interface, etc. When connected via a LAN, a configuration with a firewall, router, and agency server (proxy server) connected between the electronic commerce server 10 and external information network 1 is also possible. Furthermore, the computer 2a may naturally also be connected to the electronic commerce server 10 via the information network 1. ROM, RAM, and the like are incorporated in the temporary memory unit (main memory unit) 10c in the electronic commerce server 10. ROM functions as program memory or the like in which programs executed within the electronic commerce server 10 are stored; RAM functions as data memory or the like which stores data or the like utilized during program execution within the electronic commerce server 10 and is used as a work area.

Although omitted from the detailed drawings, input devices for the computers 1a, 2a, and 3a may be similarly configured with a keyboard, mouse, or the like, and output devices may be implemented by for example a display unit, such as a liquid crystal display (LCD) or CRT display or a printer. Furthermore, ROM, RAM, and the like are incorporated in the temporary memory unit (main memory unit) of the computers 1a, 2a, and 3a. ROM functions as for example program memory for the computers 1a, 2a, and 3a, and RAM functions as for example data memory for the computers 1a, 2a, and 3a.

The auction site administrator 12 then controls the electronic commerce server 10 and discloses an auction site on the information network 1 by operating the computer 2a. Access to this auction site can be made from a many computers or portable information terminals including the computer 1a for the seller 11 and the computer 3a for the buyer 13 from all over the world via the information network 1. In other words, in FIG. 1 and FIG. 2 one each of both the computer 1a for the seller 11 and the computer 3a for the buyer 13 is shown, however, this is merely a most simplified illustrative expression. In practice, there exists an extremely large number of computers on both the seller's side and on the buyer's side because computers all over the world can be subjects.

(Electronic Commerce Method)

The procedure for an electronic commerce method according to an embodiment of the present invention is described using the flowchart in FIG. 3.

(a) To begin with, in step S101, the seller 11 prepares the item X he/she wishes to sell. Next, in step S102, the seller 11 inputs the item information (bibliographic data) with respect to the item X using the input device of the computer 1a. This input data (information) is transferred from the computer 1a to the information network 1 via the DCE 52, transmitted to the electronic commerce server 10 via the information network 1, and then uploaded (see the information flow F1 in FIG. 1).

When transmitting the bibliographic data with respect to the item X in this step S102, an input screen transmitted from the electronic commerce server 10, for instance such as that shown in FIG. 4, is shown on the display of the computer 1a for the seller 11, and the seller 11 inputs the bibliographic data with respect to the item X using the form in this input screen. For example, the seller inputs bibliographic data with respect to the item X including "personal information on the seller (name, residence address, E-mail address, etc.)", "name of item for sale", "quantity (number of pieces)", "price at beginning of auction", "preferred minimum bidding price (reserve)", "payment method (form of payment)", "description of item for sale", and the like from the input screen shown in FIG. 4 either through selection using drop-down lists or direct input to text boxes, and this information is transmitted to the electronic commerce server 10 via the information network 1. In addition, it is also possible for the seller 11 to input an electronic image or a concrete description to more clearly display the details of the item X to the buyer 13.

It should be noted that the "seller's personal information" may have already been communicated to the auction site administrator 12 at the time of member registration with the auction site. In such a case, an identification code such as an "ID number" may be assigned to the computer 1a for the seller 11, and the personal information may be recorded in the member file memory unit 10f with the identification code (ID number) as the master key. Accordingly, it is possible to replace the "seller's personal information" by inputting that identification code in the screen of FIG. 4.

(b) In step S103, the seller 11 either selects the "auction period of item X" as the "transaction available period" of the present invention with the drop-down list or directly inputs it into the text box from the screen of FIG. 4 that is displayed on the display of the computer 1a. The computer 1a then transmits this input data to the electronic commerce server 10 (see the information flow F1 in FIG. 1). Common periods are normally decided for the "auction period (transaction available period)" by the auction site administrator 12, and designed so that by accessing the electronic commerce server 10, the buyer 13 can select from a drop-down list, a period, such as "3 days", "7 days", "10 days", "14 days", or the like through a simple operation such as the click of a mouse.

Furthermore, it is preferable if the electronic commerce server 10 provides an input screen in response to a request from the seller 11 so that the item information with respect to the item X can be added or amended as required even after the online auction has begun. This is to allow a buyer 13 that is interested in the item X to be provided with further detailed item information. Various pieces of item information transmitted to the electronic commerce server 10 via the screen of FIG. 4 are temporarily stored in the item information temporary memory unit 10a via the communication control circuit 31, online control circuit 32, item information registration circuit 42, and database management circuit 33 in the electronic commerce server 10.

(c) After selection or direct input of the "auction period of item X" has finished, processing proceeds to step S104. In step S104, the electronic commerce server 10 that has received transmission of the "auction period" from the seller 11 performs data matching to judge whether an irregular day occurs in this period using the irregular day information comparison circuit 43 embedded in the CPU 23 of the electronic commerce server 10. In other words, the irregular day information accumulated beforehand in the time adjustment information memory unit 10b is read out via the database management circuit 33 in the electronic commerce server 10, and the irregular day information comparison circuit 43 judges whether there is an irregular day in the auction period specified by the seller 11.

Here, an example is described where the seller 11 is a resident of the Eastern portion of the United States (e.g., New York or Washington, D.C.) and attempts to start an online auction at 9:00 P.M. on Mar. 22, 2000 with a period of "3 days" as the "auction period". In this case, the online auction will end at Mar. 25, 2000, 9:00 P.M., United States, Eastern Time zone. When the electronic commerce server 10 receives information with respect to the "auction period", which is sent from the seller 11 in step S103, it reads out irregular day information from the time adjustment information memory unit 10b. The irregular day information comparison circuit 43 in the electronic commerce server 10 searches for irregular days for each of the countries of the world based on this U.S. Eastern time zone and performs data matching. The irregular day information comparison circuit 43 then determines through data matching that at the time the auction ends, Europe has already started Mar. 26, 2000 and that that day is the start-date of Daylight Saving Time in Europe (If it is determined that no irregular day occurs in the auction period in step S104, processing immediately proceeds to step S108.).

(d) As in the above example, if an irregular day is determined to occur in the auction period in step S104, processing proceeds to step S105. In step S105, the irregular day notification circuit 44 in the electronic commerce server 10 transmits the fact that an irregular day occurs in the auction period to the computer 1a owned by the seller 11 via the online control circuit 32 and communication control circuit 31 (see the information flow F2 in FIG. 1). It is preferable for this notification to be carried out immediately. In other words, it is preferable if the electronic commerce server 10 instantly sends a notification to the browser screen of the computer 1a for the seller 11 immediately after the seller 11 has input the "auction period" via the screen of FIG. 4 shown on the display of the computer 1a and that input data is transmitted to the electronic commerce server 10. Thus, it is preferable for the irregular day information comparison circuit 43 in the electronic commerce server 10 to execute the data matching processing at high speed. However, in the case where the auction site grants a time margin before the online auction begins, notification can be done through E-mail or the like instead of notification via the browser screen.

For notification of an irregular day performed in step S105, it is preferable to have a description meaning 'the finish time of this online auction cannot be simply determined as being 24 hours×3=72 hours after the start time of the online auction from the clock time at the present moment in a certain region (Europe in this example)'. A screen such as that in FIG. 5 can be employed as an example of a screen used for notification in step S105. The screen shown in FIG. 5 explains the fact that 'since 2:00 A.M. on Mar. 26, 2000, which is the end-date of the online auction does not exist in Europe, residents in Europe have to use one hour added to the current time as a reference, and therefore a disadvantage of some kind may occur during electronic commerce'. Furthermore, it is also possible to indicate additional information in the screen of FIG. 5 to explain the fact that 'because the finish time of the online auction overlaps precisely with the start time of Daylight Saving Time (one minute after 1:59 A.M. on Mar. 26, 2000) in the United Kingdom, users recognizing 2:00 A.M. as the finish time of the online auction may not be able to determine the correct online auction finish time and be confused'. Thus, it is preferable that the details to be displayed from the electronic commerce server 10 onto the computer 1a for the seller 11 via the screen of FIG. 5 be stored in the time adjustment information memory unit 10b beforehand to allow unique extraction in conjunction with the results of the data matching mentioned above. The electronic commerce server 10 showing such time adjustment information on the display of the computer 1a for the seller 11 in step S105 sends a prompt to the computer 1a for the seller 11 for reconsideration of the "auction period" in step S106. Whether the seller 11 is willing to change the auction period or chooses not to change it in step S106, or again on moving to step S107, whether or not to cancel the online auction itself depends on the final decision made by the free will of the seller 11.

In step S105, the items given below are examples of information to be displayed.

Figure 5:
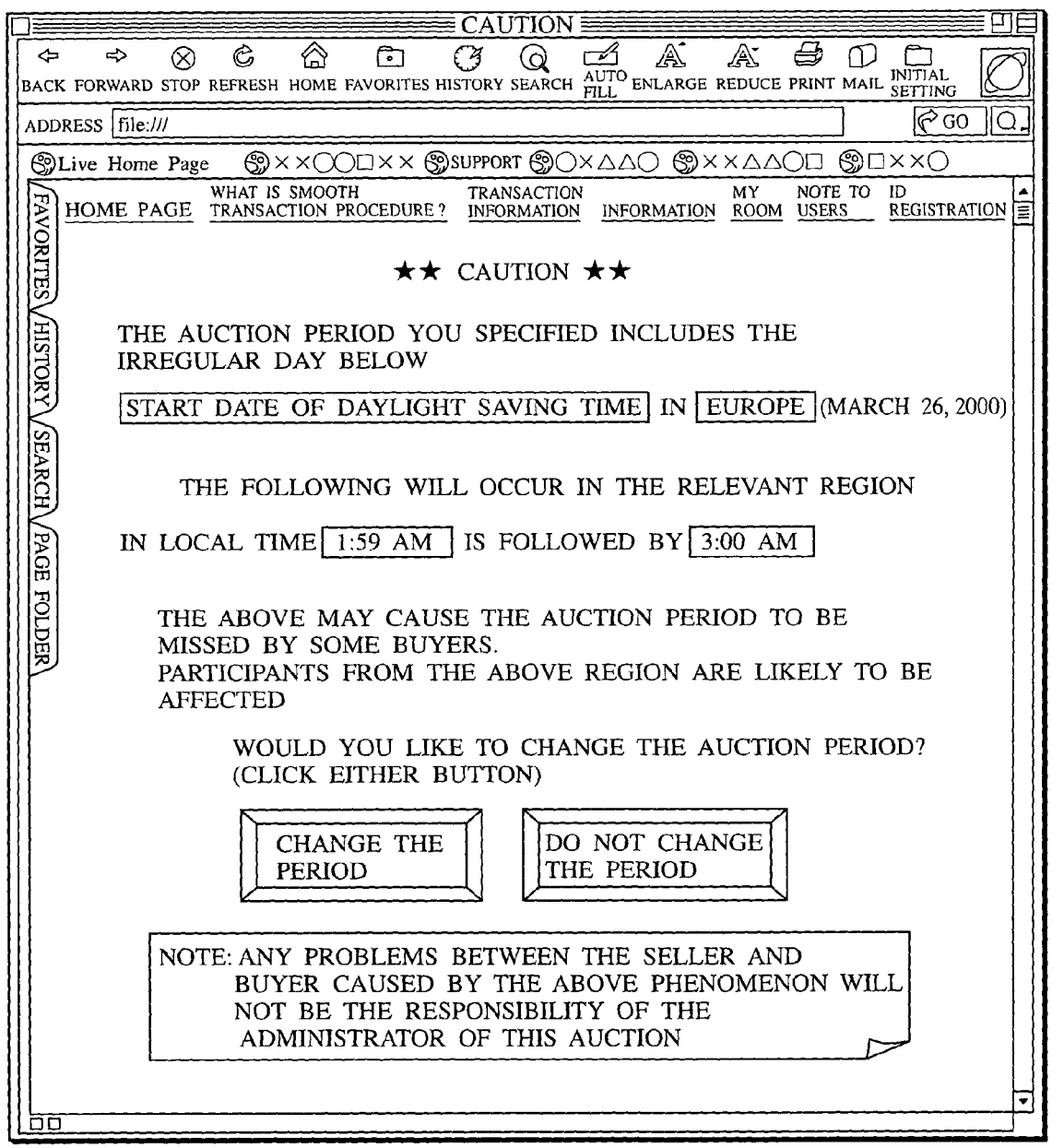
FIG. 5 is a diagram illustrating an example of a method for displaying the description provided from an electronic commerce server to the seller in the case where an irregular day occurs during the auction period.

(I) An irregular day is included in the auction period (II) The regions, countries, etc. that have an irregular day (III) Specific change in time difference (IV) Other descriptions, such as details explaining the fact that the auction site administrator 12 does not bear responsibility in the case where a problem caused by an irregular day occurs These are displayed from the electronic commerce server 10 onto the display of the computer 1a for the seller 11 via the browser screen shown in FIG. 5, or equivalent details may be notified by E-mail. Naturally, simply notifying details (only (I) and (II) above) such as 'confusion may occur in electronic commerce since the finish time of the online auction is on the start-date of Daylight Saving Time (Summer Time) in Europe' is also possible.

(e) After receiving notification of an irregular day, the seller 11 can choose to click either the button indicating "Change the period" or the button indicating "Do not change the period" for the online auction in the screen shown in FIG. 5. In other words, in step S106, in the case where the seller 11 has determined that the online auction will not be affected by the start-date of Daylight Saving Time in Europe, the seller 11 selects the "Do not change the period" button with the auction period still set to three days and proceeds to step S108. When the "Do not change the period" button is selected, information on the unchanged period is again transmitted from the computer 1a to the electronic commerce server 10 (see the information flow F1 in FIG. 1). Once this occurs, the electronic commerce server 10 transmits the confirmation screen shown in FIG. 6 to the computer 1a for the seller 11 (see the information flow F2 in FIG. 1). The transmission of this screen puts into effect the online auction of the item X in step S108. Within the electronic commerce server 10, by making use of the database management circuit 33, the item information disclosure processing circuit 46 selects applicable item information from among the various pieces of item information that are temporarily stored in the item information temporary memory unit 10a, and transfers these to the disclosable item information memory unit 10d, which is a different memory unit within the electronic commerce server 10 (or connected to the electronic commerce server 10). By transferring item information to the disclosable item information memory unit 10d using of the database management circuit 33, this item information can be placed in an environment where it is commonly provided in answer to access from the buyer 13 side. Furthermore, in the case where a small margin of time is allowed for item information in the electronic commerce server 10 to be transferred, a rough estimation of the wait time until viewing of the online auction of the item X is possible may be displayed as shown in FIG. 6.

On the other hand, in the case where the seller 11 is willing to change the auction period on receiving the notification of an irregular day from the electronic commerce server 10 in step S105, the seller 11 chooses (clicks) the "Change the period" button in the screen of FIG. 5 in step S106 and proceeds to step S107 (see the information flow F1 in FIG. 1). In step S107, processing returns to step S103 unless the seller 11 wishes to cancel the auction itself. Processing in the repetitive loop that starts by returning to step S103 and proceeding to step S106 is described separately later. Here, a case of immediately advancing from step S106 to step S108 is described.

Figure 6:
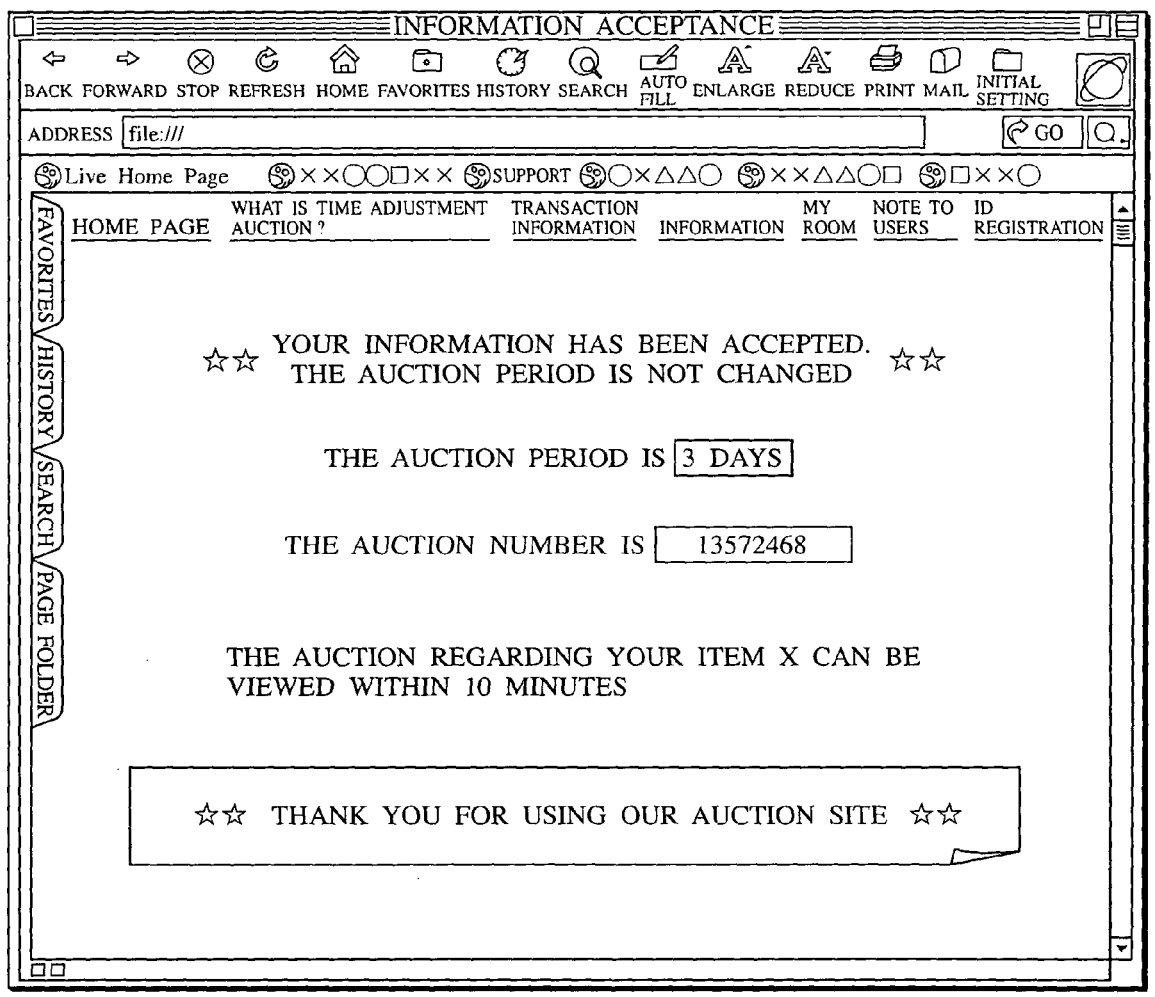
FIG. 6 is a diagram illustrating an example of a method for an electronic commerce server to confirm with the seller in the case where the seller has decided not to change the auction period.

(f) In step S108, display data such as that shown in FIG. 6 is transmitted from the electronic commerce server 10 to the computer 1a for the seller 11, and the screen of FIG. 6 is shown on the display of the computer 1a. In other words, the online auction with respect to the item X begins (is disclosed) after a designated time elapses in step S108. Once the item information with respect to the item X is disclosed due to the start of the online auction in step S108, the buyer 13 can then access the electronic commerce server 10 via the computer 3a and freely view that display page (FIG. 9) (see the information flow F3 in FIG. 1). At this time, cautionary items with respect to the finish time of the online auction are additionally entered on the display page for the item X as shown in FIG. 9. The cautionary items here are somewhat different from the items previously displayed on the display of the computer 1a for the seller 11, and it is preferable that how to determine the finish time be explained. This is because the buyer 13 is forced to act in accordance with the passage of time when participating in electronic commerce with a time limit. For example, since Daylight Saving Time in Europe is given as an irregular day with the above example, it is hardly disadvantageous to the seller 11 (resident of the United States). On the other hand, in the case where the buyer 13 is a resident of Europe, particularly a resident of the United Kingdom, a problem occurs near the end of this online auction for the buyer 13, and therefore a fair amount of attention needs to be given to the occurrence of the irregular day. Accordingly, it is preferable to provide in the display page for the item X shown in FIG. 9, not only the display regarding the occurrence of an irregular day, but it is also preferable that sufficient information to prevent disadvantages to an online auction participant (buyer 13) be provided in clear, easy-to-understand terms, without regard to the region, country, etc. in which one lives by, for example, keeping track of the time remaining until the online auction ends in real time. For example, the following settings are made so that the items given below are entered in the display page for the item X.

(i) An irregular day is included in the auction period
(ii) The regions, countries, etc. that have an irregular day
(iii) Specific changes in time difference
(iv) Methodologies to counteract the time difference
(v) Display of time remaining until online auction finishes
(vi) Other descriptions, such as details explaining that the auction site administrator 12 does not bear responsibility in the case where a problem caused by an irregular day occurs In addition to that, the irregular day notification circuit 44 embedded in the CPU 23 of the electronic commerce server 10 is set up so that annotations such as "caution is required because the clock time will change" or "expedited bidding is recommended" are added. Thus, the main subject of the present invention is that the auction site administrator 2 provides item information for the item X together with irregular day information via the irregular day notification circuit 44 in the electronic commerce server 10 in order to arouse sufficient caution in the seller 11 or buyer 13.

Figure 10:
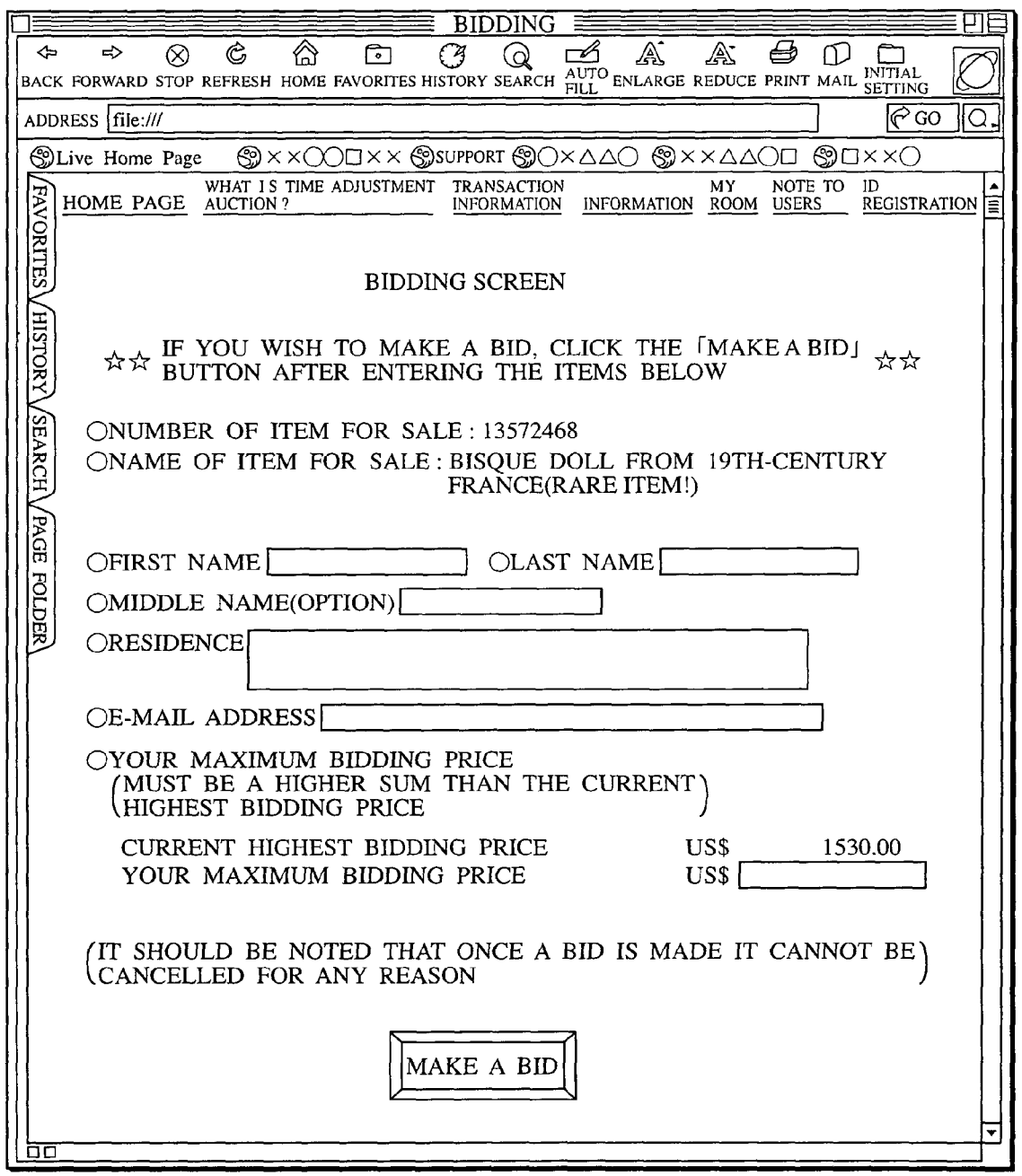
FIG. 10 is a diagram illustrating an example of a bidding screen for the online auction of the item X, which is provided from the electronic commerce server to the seller.

(g) Then, basically whoever is interested in the online auction with respect to the item X that can be viewed is given the right to participate in that online auction in step S109. The buyer 13 that wishes to participate in the online auction in step S109 communicates with the electronic commerce server 10 (see the information flow F3 in FIG. 1) by clicking on the button for "Move to bidding screen", that is the bidding button in FIG. 9, and acquires the bidding screen in FIG. 10 from the server (see the information flow F4 in FIG. 1). In step S109, the buyer 13 selects or directly inputs the "personal information on the buyer (name, residence address, E-mail address, ID number, etc.)", "maximum bidding price", and the like in the screen of FIG. 10, and that input information is transmitted to the electronic commerce server 10 (see the information flow F3 in FIG. 1). The bidding procedure by the buyer 13 is completed by this procedure of making use of the input device 21 of the computer 3a for the buyer 13. Information input from the computer 3a for the buyer 13 is accumulated in the bidding information memory unit 10e via the communication control circuit 31, online control circuit 32, item information disclosure processing circuit 46, and database management circuit 33, however the "maximum bidding price" is not disclosed at this moment. Instead, the ranking of bidders based on the bidding prices at the present moment or whether one has proposed the current highest bidding price is disclosed by means of partial personal information (ID number or the like) input by the buyer 13 onto the auction site on the information network 1 via the item information disclosure processing circuit 46, online control circuit 32, and communication control circuit 31. These are successively updated by the item information disclosure processing circuit 46 in accordance with the passage of time in the auction site on the information network 1. Until the online auction ends, anyone can view information on the ranking of bidders based on the bidding prices at the present moment or if one has given the current highest bidding price by accessing the electronic commerce server 10 and viewing FIG. 10 (see the information flow F3 in FIG. 1).

(h) Because the information network 1 expands all over the world, it is quite usual that a large number of people on the buyer's side wish to bid for the item X. Therefore, the current highest bidding price rises as time passes. The item information disclosure processing circuit 46 then decides the highest "maximum bidding price", that is, the buyer 13 that has proposed the highest purchase condition before the end of the "online auction period" specified by making use of the input device 21 of the computer 1a for the seller 11, in order to determine the buyer 13 that gains the right to purchase that item X. In other words, the online auction for this item X ends at this moment (step S110).

(i) The buyer 13 that has gained the purchase right as the high bidder receives from the item information disclosure processing circuit 46 in the electronic commerce server 10 an E-mail notifying the "item X that was successfully bid", "contract bidding price A", "E-mail address of the seller 11", and the like within a designated time after the online auction ends. Furthermore, at the same time as receiving the above notification, the buyer 13 receives instructions to contact the seller 11, for example, within three days (see the information flow F4 in FIG. 1). The item information disclosure processing circuit 46 notifies similar details to the computer 1a for the seller 11 (see the information flow F2 in FIG. 1). As described, the auction site administrator 12 performs the operation of deciding the combination of the seller 11 and buyer 13 for the item X via the item information disclosure processing circuit 46 in the electronic commerce server 10. Thereafter, the seller 11 and buyer 13 communicate by using E-mail. First, confirmation of the "contract bidding price A" and confirmation of the "postage cost B" for the seller 11 to send the item X to the buyer 13 is performed by exchanging E-mail, etc. between the seller 11 and buyer 13. The contract bidding price A is automatically decided by the item information disclosure processing circuit 46 when the online auction ends. However, since the postage cost B depends on the size and weight of that item X or on the delivery method described later, it is preferable for the two parties to confirm it. Furthermore, personal information, such as residence addresses, names, or the like, which is necessary for future contact or sending the item for sale are exchanged at the same time (see the information flow F5 in FIG. 1). As shown in FIG. 9, in the case where the seller 11 requests payment with a specific credit card or a personal check (cheque), the buyer 13 selects an adequate form among these.

(j) If the buyer 13 selects payment by check, the buyer 13 writes a personal check for the amount of "contract bidding price A"+"postage cost B" addressed to the seller 11 and sends it to the residence address of the seller 11 (see the goods flow F6 in FIG. 1).

(k) Immediately after the seller 11 receives the personal check, the seller 11 contacts the buyer 13 regarding that fact by E-mail or the like. Then in step S112, the item X is sent to the residence address of the buyer 13 (see the goods flow F6 in FIG. 1).

With the set of procedures mentioned above, electronic commerce relating to the item for sale shown in FIG. 9 is completed.

(Change of Auction Period)

As described above, the electronic commerce server 10 is able to repeat the loop from step S103 through step S106 in respect to deciding the "auction period". In other words, the seller 11 can change the "auction period" to a more appropriate period by repeatedly executing the processing shown below as required.

Figure 7:
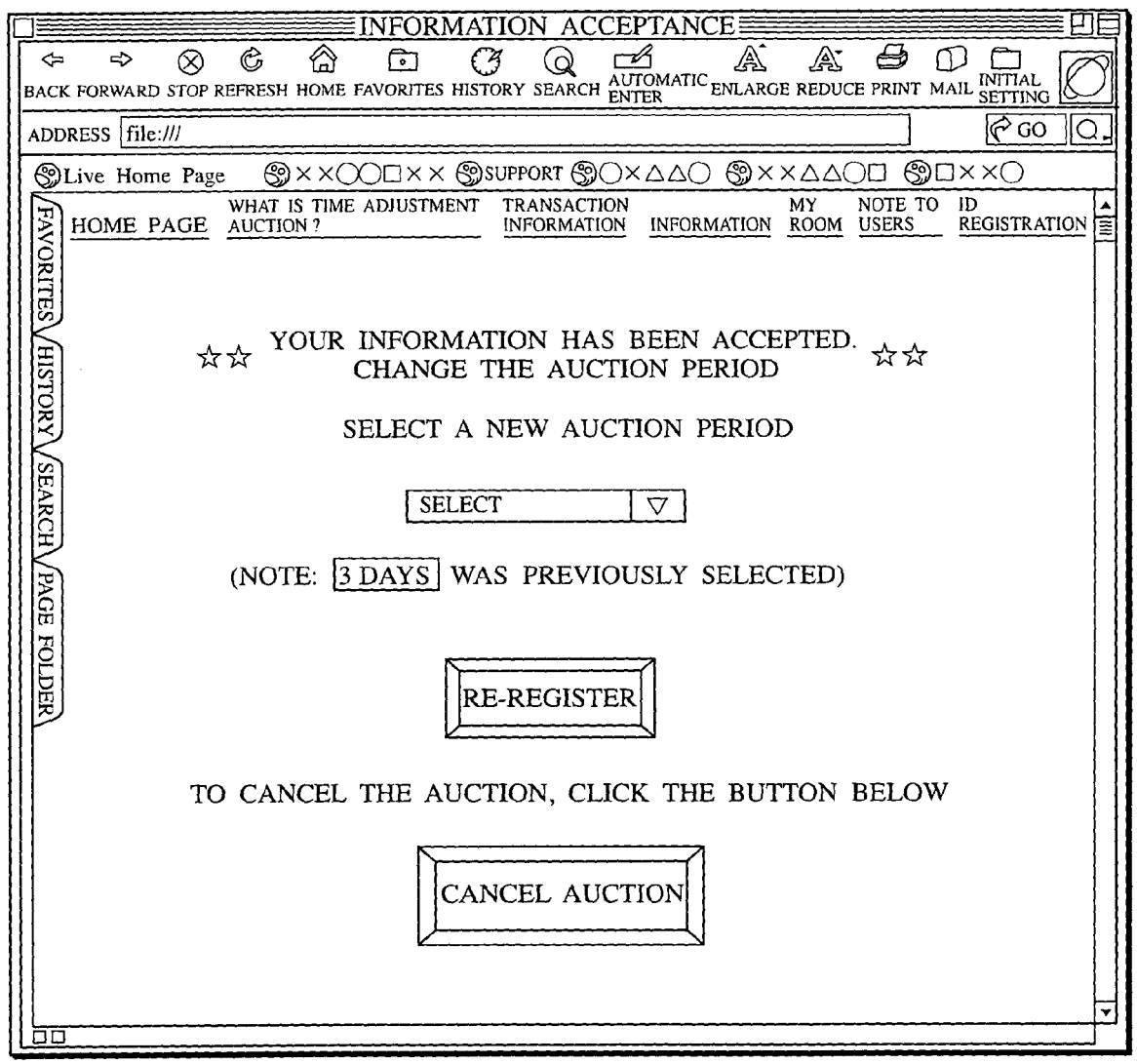
FIG. 7 is a diagram illustrating an example of a method for an electronic commerce server to confirm with the seller in the case where the seller has decided to change the auction period.

(R1) As described so far, after receiving notification of an irregular day, the seller 11 can choose to click either the button for "Change the period" or the button for "Do not change the period" for the online auction in the screen shown in FIG. 5. Here, the case is described where on receiving a notification of an irregular day from the electronic commerce server 10 in step S105, the seller decides to change the auction period. In this case, the "Change the period" button is chosen (clicked) in the screen of FIG. 5 in step S106 (see the information flow F1 in FIG. 1), and processing proceeds to step S107. In step S107, processing returns to step S103 unless the seller 11 wishes to cancel the auction itself. In this case, the electronic commerce server 10 redisplays the input screen of FIG. 4 on the display of the computer 1a for the seller 11 in step S103 (see the information flow F2 in FIG. 1). At that time, it is possible to make only the "auction period" item highlighted to prompt re-input while displaying the other items with the previously input details unchanged. In other words, the item information registration circuit 42 and database management circuit 33 in the electronic commerce server 10 read out the item information in the item information temporary memory unit 10a, and send back the previously input item information to the computer 1a for the seller 11 via the online control circuit 32 and communication control circuit 31. Thus, display of the previously input details on the display of the computer 1a without change saves the seller 11 the trouble of inputting redundant information. Furthermore, showing an input screen such as that shown in FIG. 7, is possible to simplify items on the screen. Because the previously selected auction period is displayed with an annotation in FIG. 7, the mistake of selecting the same auction period can be avoided.

(R2) Furthermore, as shown in FIG. 7, an option to cancel the online auction itself is provided in step S107 for accommodating the seller 11 in electronic commerce. Cancellation of the online auction itself in step S107 initiates processing in step S101. Such an option grants a safe opportunity to participate anew in the online auction after the irregular day has passed. Even in the case where the seller 11 cancels the online auction in step S107 (see the information flow F1 in FIG. 1), the item information input from the screen of FIG. 4 is never disclosed. The item information registration circuit 42 deletes the item information that has been stored in the item information temporary memory unit 10a for a designated period via the database management circuit 33.

Figure 8:
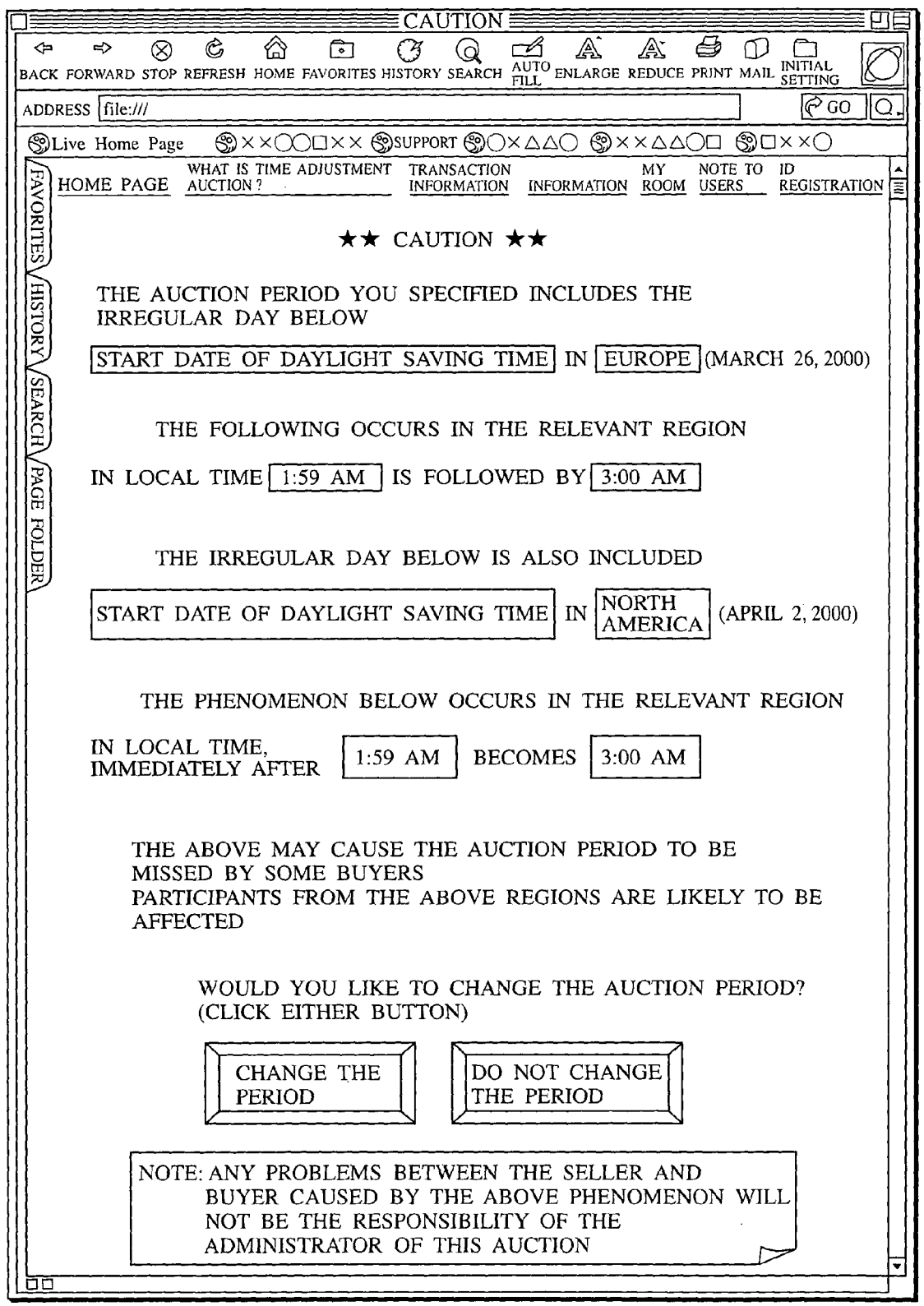
FIG. 8 is a diagram illustrating another example of a method for displaying the description provided from an electronic commerce server to the seller in the case where an irregular day occurs during the auction period.

(R3) On the other hand, if the seller 11 does not cancel the online auction itself in step S107, processing returns to step S103. This time it is assumed that "14 days" is selected from the pull-down menu shown in FIG. 7 in step S103, and the selection is transmitted to the electronic commerce server 10 (see the information flow F1 in FIG. 1). Namely, the seller 11 has selected Mar. 25, 2000, 9:00 P.M., United States, Eastern time zone as the finish time of the online auction. The communication control circuit 31, online control circuit 32, irregular day modification circuit 45, and database management circuit 33 store this changed "auction period of item X" in the item information temporary memory unit 10a. In addition, the irregular day information comparison circuit 43 in the electronic commerce server 10 searches for irregular days for each of the countries of the world based on this U.S. Eastern time zone and performs comparison (data matching) in step S104 while referencing the time adjustment information memory unit 10b again. It is then determined that the start-date of Daylight Saving Time in North America occurs three days before this online auction ends. Hereupon, again in step S105, the irregular day notification circuit 44 in the electronic commerce server 10 notifies the computer 1a for the seller 11 of the fact that the auction period includes two irregular days, that is the start-date of Daylight Saving Time in Europe and the start-date of Daylight Saving Time in North America (see the information flow F2 in FIG. 1). For example, this notification has details such as that shown in FIG. 8, and includes the above items (I), (II), (III), and (IV). The seller 11 learns from the notification of FIG. 8 (step S105) that two irregular days are included in the auction period. However, at the same time, the seller 11 also learns that the end-date of the online auction does not overlap with an irregular day in another region, country, or the like, unlike at the previous input. Consequently, the seller 11 can judge that the buyer 13 side is less affected than at the previous input although a period including two irregular days has been selected, and can click (choose) the "Do not change the period" button in the screen of FIG. 8 to proceed to step S108. This information on "Do not change the period" being selected is transmitted to the electronic commerce server 10 (see the information flow F1 in FIG. 1). If the "Change the period" button is clicked (selected) again in the screen of FIG. 8, processing proceeds to step S101 or step S103 via step S107.

In this manner, the electronic commerce server 10 accepts the change request from the computer 1a for the seller 11, and using the irregular day modification circuit 45 repeats the changing of the "auction period" in step S106 as many times as necessary. The irregular day modification circuit 45 repeats the loop of returning to step S103 from step S106 and executes the modification processing until the computer 1a for the seller 11 no longer sends a signal (information) to change the period in step S106, or sends signals (information) to cancel the online auction itself in step S107.

(Medium Storing Electronic Commerce Program)

It should be noted that the electronic commerce method shown in the flowchart in FIG. 3 can be put into practice as a computer based program. In other words, electronic commerce according to an embodiment of the present invention can be executed by controlling the electronic commerce server 10 shown in FIG. 2 with a program corresponding to the flowchart in FIG. 3.

Although not shown in the drawing, the main unit of the electronic commerce server 10 shown in FIG. 2 is equipped with a floppy disk device (floppy disk drive), optical disk device (optical disk drive), and the like. A floppy disk storing a program corresponding to the flowchart in FIG. 3 is inserted in the slot of the floppy disk drive, and a CD-ROM, DVD-ROM, DVD-RAM, or the like storing program corresponding to the flowchart in FIG. 3 is inserted in the slot of the optical disk drive. Performing a designated reading operation on such recording media installs the program stored in these recording media into the system of the electronic commerce server 10. Furthermore, connection of a designated drive device allows a program corresponding to the flowchart in FIG. 3 to be recorded using, for example, ROM utilized as a memory device in a game pack or the like, or a cassette tape utilized as a magnetic tape drive.

OTHER EMBODIMENTS

The electronic commerce method according to an embodiment of the present invention and executed with this kind of procedure proves to be exceptionally effective in the case where an irregular day occurs on the final day in the period for electronic commerce. Generally, with electronic commerce for a limited period, which is typified by online auction, that period is assumed to be easily determined from the current clock time. However, in the case where an irregular day, such as the start-date or end-date of Daylight Saving Time is included in that period, the relational expression of "1 day=24 hours" does not hold true in some specific regions, countries, or the like. Particularly, this is a problem that has an impact throughout the entire world in borderless electronic commerce. Even in a country such as Japan which for the present does not have Daylight Saving Time System, the period in which electronic commerce is possible may be recognized incorrectly unless aware of the occurrence of this irregular day. Particularly, so long as irregular days such as those in Daylight Saving Time occur in countries that are key players in electronic commerce, like the United States, the existence of irregular days in electronic commerce must also be shared with residents of other regions and countries.

Accordingly, such as in the embodiment of the present invention, utilization of the configuration and functions of his/her own electronic commerce server 10 by the auction site administrator 12 to determine the irregular day and present its occurrence to the seller 11 and buyer 13 greatly contributes to management of stable electronic commerce and promotion of electronic commerce with little misidentification.

It should be noted that the embodiment described above only shows a single example of the present invention. The object of the present invention, namely, the technical idea to present irregular day information from the server to the seller or buyer to arouse awareness, can also be expressed other embodiments.

For example, the electronic commerce server 10 is designed so that irregular day information can be checked on the same screen as the disclosed page of item X in the example shown in FIG. 9. However, irregular day information does not have to be provided on each disclosed page for each item for sale, and it is possible for example to provide it only on the top page of the auction site. In this case, an equivalent effect can be expected by, for example, arranging in the screen in FIG. 9, a simple description prompting that this top page should be referenced and a link button that can be clicked to jump to this top page for reference. Furthermore, aside from this, the electronic commerce server 10 can be designed so that the irregular day information accumulated in the time adjustment information memory unit 10b is referenced on a daily basis, and the irregular day information is displayed on the top page of the auction site the moment the number of days before an irregular day has reached the designated number of days.

Alternatively, a page dedicated to the irregular day information may be provided for displaying the irregular day information in details. For example, in a page with a global map displayed, together with the time difference between each region, the irregular day information may be displayed with different colors used for each kind. In this case, an equivalent effect can be expected by, for example, arranging in the screen in FIG. 9, a simple description prompting that this page dedicated to the irregular day information should be referenced and a link button that can be clicked to jump to this page dedicated to the irregular day information for reference.

Here, for the designated number of days until an irregular day, in the case where the maximum value that can be set as the auction period is 14 days, setting a greater value of "within 21 days" as the designated number of days may be one of the way of preventing the sellers and buyers from being confused. In the case where Daylight Saving Time is kept in mind for irregular days, because the start-date and end-date of Daylight Saving Time for all the regions and countries of the entire world are generally concentrated in specific periods, the irregular day information needs only to be displayed twice a year during those periods.

It should be noted that though "online auctions" are covered in the description above, it is merely an example used for describing the present invention. Namely, online auctions are just referred to as a representative example of electronic commerce where the transaction available period is limited. With electronic commerce other than online auctions, the present invention may be applied to any form of electronic commerce as long as the transaction available period has a time limit and it is possible to expect desired results. By way of example, the present invention may even be applied to something with an application period, such as a prize contest or the like.

Furthermore, in the case where the final day of the time limit happens to be an irregular day, needless to explain, the effect of the present invention is exercised to its fullest extent. It should be noted that the most distinguished example of an irregular day is the start-date and end-date of Daylight Saving Time on which a time difference of no less than one hour occurs on a specific day, as this has been introduced in at least 70 countries in the world, the ripple effect is also significant. In addition to this, the day on which a "leap second" is set may also be considered as an irregular day. Although the "leap second" is a time difference of only one second, application of the present invention is of no small importance in fields such as dealings on the stock exchange, where real-time electronic commerce is conducted.

As described above, in the case where an irregular day is included in the period during which electronic commerce is conducted, the present invention ensures understanding of this period and the finish time. Accordingly, electronic commerce can be conducted reliably and smoothly.

The invention claimed is:

1. An electronic commerce method comprising:

recording global regions where time adjustment is performed with respect to clock times in the global regions and time adjustment information related to details of the time adjustment into a time adjustment information memory;

comparing a transaction available period for electronic commerce, provided through an information network, with the time adjustment information recorded in the time adjustment information memory;

sending a first signal for generating a first screen via the information network to a computer of a seller when existence of an applicable time adjustment day in the transaction available period is determined as a result of the comparison, the first screen indicating a region name where the time adjustment is performed, an information notice notifying the seller that a change of the transaction available period for electronic commerce is required with respect to date and region thereof, and a button for selecting whether or not the change of the transaction available period for electronic commerce is acceptable by the seller prior to a start time of an electronic commerce transaction;

notifying the seller on the first screen of an amount of time remaining for a transaction available period with respect to a specific item for sale;

receiving an accept signal provided by the button indicating that the change of the transaction available period for electronic commerce is acceptable, from the computer of the seller via the information network, thereby changing the transaction available period of the specific item for sale using the time adjustment information prior to the start time of the electronic commerce transaction; and sending a second signal for generating a second screen via the information network to the computer of the seller, after receiving the accept signal, wherein the second screen facilitates the change of the transaction available period for the electronic commerce with respect to the specific item for sale based on the result of the selection of the button, thereby starting the electronic commerce transaction.

2. The electronic commerce method of claim 1, further comprising:

temporarily recording item information with respect to the specific item for sale, which is fed through the information network in an item information temporary memory unit;

recording disclosable item information selected among the item information recorded in the item information temporary memory unit in a disclosable item information memory unit; and electronically disclosing on the information network, the disclosable item information recorded in the disclosable item information memory unit.

3. The electronic commerce method of claim 1, further comprising changing the transaction available period for electronic commerce with respect to the specific item for sale using information fed through the information network.

4. The electronic commerce method of claim 1, wherein sending the first signal includes information required for determining a finish time of electronic commerce.

5. The electronic commerce method of claim 1, wherein sending the first signal includes information with respect to date and region where the time adjustment is performed.

6. The electronic commerce method of claim 1, wherein a portion of the first screen generated in the sending of the first signal includes item information.

7. The electronic commerce method of claim 1, wherein the time adjustment day includes the start-date or end-date of Daylight Saving Time.

8. The electronic commerce method of claim 1, wherein the existence of the time adjustment day is electronically notified using a screen of a page different from a disclosed web page of the specific item for sale.

9. The electronic commerce method of claim 1, wherein sending the first signal comprises two stages of:

notifying existence of the time adjustment day to a seller side input terminal for the specific item for sale; and notifying existence of the time adjustment day to a buyer side input terminal for the specific item for sale.

10. The electronic commerce method of claim 1, wherein sending the first signal notifies existence of the time adjustment day onto the top page of a site that discloses the electronic commerce.

11. The electronic commerce method of claim 10, wherein a link module is provided on a disclosed web page of the specific item for sale to jump to the top page of the site that discloses the electronic commerce, and selection of the link module enables jumping to the top page to send the first signal.

12. The electronic commerce method of claim 1, wherein sending the first signal notifies existence of the time adjustment day on a page dedicated to irregular day information that is provided as another page in a site that discloses the electronic commerce.

13. The electronic commerce method of claim 12, wherein a link module is provided on a disclosed web page of the specific item for sale to jump to the dedicated page of irregular day information, and selection of the link module enables jumping to the dedicated page of irregular day information to send the first signal.

* * * * *